United States Patent [19]
Gay et al.

[11] 3,907,589
[45] Sept. 23, 1975

[54] CATHODE FOR A SECONDARY ELECTROCHEMICAL CELL

[75] Inventors: Eddie C. Gay, Park Forest; Fredric J. Martino, Dolton, both of Ill.

[73] Assignee: The United States of America as represented by the United States Energy Research and Development Administration, Washington, D.C.

[22] Filed: Jan. 18, 1974

[21] Appl. No.: 434,459

[52] U.S. Cl. .................................. 136/6 R; 136/20
[51] Int. Cl. .......................................... H01m 43/00
[58] Field of Search........... 136/6 R, 6 LF, 6 L, 6 F, 136/6 FS, 6 LN, 20, 83 R, 83 T, 100, 137

[56]  References Cited
UNITED STATES PATENTS

| | | | |
|---|---|---|---|
| 3,488,221 | 1/1970 | Shimotake et al. | 136/20 |
| 3,531,324 | 9/1970 | Fischer et al. | 136/20 |
| 3,666,560 | 5/1972 | Cairns et al. | 136/20 X |
| 3,716,409 | 2/1973 | Cairns et al. | 136/20 X |
| 3,827,910 | 8/1974 | Cairns et al. | 136/6 LF |

*Primary Examiner*—Anthony Skapars
*Attorney, Agent, or Firm*—John A. Horan; Arthur A. Churm; Hugh W. Glenn

[57] ABSTRACT

An electrochemical cell is disclosed which comprises an alkali metal anode, a molten salt electrolyte including that alkali metal in ionic form, and an improved cathode. The cathode composition comprises a transition metal sulfide such as $FeS_2$, a particulate current collector, e.g. carbon black, electrolyte and a sulfide product, e.g. $Li_2S$, of the cell reaction in excess of that produced by electrochemical reaction of the transition metal sulfide with the alkali metal in the discharge of the cell. Operation of the cell is performed by first electrocharging the cathode in series with the anode to convert the sulfide reaction product into a usable cathode reactant submerged in molten electrolyte.

10 Claims, 5 Drawing Figures

CATHODE FOR A SECONDARY ELECTROCHEMICAL CELL

CONTRACTUAL ORIGIN OF THE INVENTION

The invention described herein was made in the course of, or under, a contract with the United States Atomic Energy Commission.

BACKGROUND OF THE INVENTION

This invention relates to secondary electrochemical cells and batteries of such cells that can be employed as power sources for electric automobiles or for the storage of energy generated during intervals of off-peak power consumption.

A substantial amount of work has been done in the development of electrochemical cells and their electrodes. The cells showing most promise employ alkali metal anodes such as lithium or sodium, molten salt electrolytes containing the alkali metal ions and cathode materials of Groups VIA and VIIA of the Periodic Chart, the chalcogens and halogens. Examples of such secondary cells and their various components are disclosed in U.S. Pat. No. 3,716,409 to Cairns et al., entitled "Cathodes for Secondary Electrochemical Power-Producing Cells", Feb. 13, 1973; U.S. Pat. No. 3,666,560 to Cairns et al., entitled "Electrochemical Power-Producing Cell", May 30, 1972; and U.S. Pat. No. 3,488,221 to Hiroshi Shimotake et al., Jan. 6, 1970. All of these patents are assigned to the assignee of the present application.

Many of the prior electrochemical cells designed to have high power densities have employed sulfur as the cathode reactant. When sulfur is used alone as the active material in the cathode, it tends to escape from the electrode as a result of vaporization and dissolution into the electrolyte. Both of these effects can be suppressed to some extent by the addition of various elements such as arsenic, selenium or thallium. The use of these additives is more fully described in the assignee's copending application by Gay et al. entitled "Secondary Electrochemical Power-Producing Cells Having Mixed Cathode Compositions", filed Sept. 28, 1973, Ser. No. 401,729.

Further reductions in sulfur activity and loss can be made through use of metallic sulfides as the cathode material. For instance, electrochemical cells have been proposed which employ lithium as the anode reactant along with a transition metal sulfide such as $FeS_2$, $CoS_2$, $Co_3S_4$, $NiS_2$, $MoS_3$ or $CuS$ as the cathode reactant. (Etude Thermodynamique des Generateurs a Electrode de Lithium, Entropie, No. 40, pp. 24–34, JuilletAout 1971, Caiola et al.) Other cathode reactants that have been considered include $FeS$, $Sb_2S_3$, $As_2S_2$, $As_2S_3$ and $P_4S_{10}$. Typical cathode reactions with the above materials within a cell having a lithium metal anode are as follows:

$4e + FeS_2 + 4Li^+ \rightarrow 2Li_2S + Fe$
$2e + FeS + 2Li^+ \rightarrow Li_2S + Fe$
$4e + CoS_2 + 4Li^+ \rightarrow 2Li_2S + Co$
$8e + Co_3S_4 + 8Li^+ \rightarrow 4Li_2S + 3Co$
$4e + NiS_2 + 4Li^+ \rightarrow 2Li_2S + Ni$
$6e + MoS_3 + 6Li^+ \rightarrow 3Li_2S + Mo$
$2e + CuS + 2Li^+ \rightarrow Li_2S + Cu$.

Correspondingly, the reaction at the anode is:

$X^- + Li \rightarrow LiX + e$ (X representing a halogen or other anion) or where sodium or another alkali metal is employed as the anode reactant, that alkali metal is substituted for lithium in the anode reaction.

These transition metal sulfides and other sulfides are effective to maintain sulfur within the cathode structure but in some instances they suffer from certain disadvantages as compared to elemental sulfur as a cathode reactant. For example, the lower thermodynamic activity and greater molar equivalent weight of these compounds results in reduced cell voltage, capacity density and power density. Certain of these compounds, particularly iron pyrite, have been found difficult to form into an adherent mass with current collector materials. Furthermore, volume increases occurring with the cathode reaction can rupture an electrode or cell housing and produce electrical shorts. As an example, the above reaction employing iron disulfide as a cathode reactant results in a theoretical volume increase of 2.6 to 1 compared to a volume increase of only 1.2 to 1 where elemental sulfur is the cathode reactant. In the operation of experimental cells known to the inventors with iron pyrite as a cathode reactant, volume increases in excess of 2.6 to 1 have been observed.

Therefore, in view of these shortcomings of the prior art, it is an object of the present invention to provide a method for preparing a cathode composition including a chalcogen reactant in a form which will minimize reactant loss.

It is a further object of the present invention to provide a method of preparing a cathode including a transition metal sulfide as a reactant wherein cell voltage, capacity and power are maximized.

It is also an object to provide a novel cathode composition including a chalcogen reactant wherein the chalcogen is strongly retained within the cathode and the cathode expansion is minimized during discharge of the cell.

SUMMARY OF THE INVENTION

In accordance with the present invention, a method is presented for preparing a high-temperature, electrochemical cell including a transition metal sulfide as a cathode reactant, alkali metal as an anode reactant and an electrolyte including ions of the alkali metal. The method comprises admixing the transition metal sulfide and the sulfide product of the cell reaction into a flocculent homogeneous mass with electrolyte and a particulate current collector. The mass is enclosed within a cathode structure and assembled with the electrolyte and anode as an electrochemical cell. The cell is heated to a temperature sufficient to melt the electrolyte. An electric current is applied from cathode to anode wherein the sulfide reaction product is electrolyzed in the cathode to form additional cathode reactant other than the initial, transition metal sulfide. After thus charging the cell, it is then ready for use as a source of electrical voltage.

The invention also comprehends a novel cathode composition which includes in its initial state a transition metal sulfide and the sulfide reaction product of the cell reaction. The reaction product, e.g. $Li_2S$, permits formation of additional cathode reactant other than the transition metal sulfide within the cathode after the cell is brought to operating temperature and the electrolyte made molten. The sulfide reaction product is provided in sufficient quantity to provide a stoichiometric excess of sulfur as combined in the transition metal sulfide. In the $FeS_2$–Li cell, for example, the total atomic sulfur concentration within the cathode is in excess of twice the total atomic concentration of iron. Where carbon or other particulate, electrically conducting material is included within the cathode as a current collector material, the presence of lithium sulfide is of further benefit in wetting the surfaces of the current collector with electrolyte.

BRIEF DESCRIPTION OF THE DRAWINGS

The present invention is illustrated in the accompanying drawings wherein.

DETAILED DESCRIPTION OF THE PREFERRED EMBODIMENT

Figure 1:
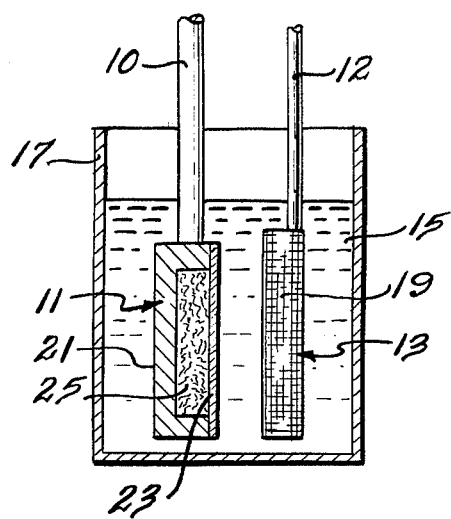
FIG. 1 is a schematic view of an experimental cell used to demonstrate the present invention.

Referring to FIG. 1, an experimental secondary electrochemical cell is presented. The cell comprises a cathode 11 and an anode 13 separated and covered by a molten electrolytic salt 15 disposed within an alumina crucible 17. Electrical leads 10 and 12 extend from cathode 11 and anode 13 respectively for connection to an electrical load (not shown). One suitable form of anode 13 includes a porous substrate of stainless steel impregnated with molten lithium metal. The stainless steel substrate can comprise a compacted and sintered mass of stainless steel fibers processed to provide the desired porosity, e.g. about 90%. As shown, the anode structure is enclosed within an expanded mesh 19 of molybdenum metal to act as a current collector and insure structural integrity.

Cathode structure 11 includes a sealed graphite housing 21 with a window 23 of porous fabric facing the anode structure. Window 23 can be of boron nitride, calcium zirconate, yttria or other suitable porous fabric. The improved cathode material 25 of the present invention is placed within the inner chamber defined by housing 21 and window 23.

In practice, any cell design may be used with the cathode material of the present invention. The cell of FIG. 1 merely represents an example of the type cell used experimentally to test and prove the operability of the invention. One practical cell design which could be used in making up electrochemical batteries for off-peak storage of electrical power, as a power source for an electric vehicle, or even as a small battery for implantation within a living being or animal is illustrated and completely described in the assignee's copending patent application entitled "Modular Electrochemical Cell" to Walsh et al., filed Nov. 15, 1973 Ser. No. 416,311. In this modular cell design, the cathode material is enclosed within a porous fabric, possibly reinforced with a metallic mesh, and placed between two anode structures within a sealed, disk-shaped housing.

Cathode material 25 is a blend of particulate reactant materials, a particulate current collector and a molten electrolyte forming a flocculent mass. A transition metal sulfide such as $FeS_2$, $CoS_2$, $Co_3S_4$, $NiS_2$ or $MoS_3$ is selected as a cathode reactant. In addition to the transition metals, it is reasonable, in view of the reference cited within the Background of the Invention to assume that a copper sulfide would also serve as a cathode reactant.

The current collector can be an electrically conductive material such as finely divided carbon black particles. Various alkali metal salts and mixtures of salts are well known as electrolyte materials for use in high-temperature cells. Eutectic compositions of LiF—LiCl—KCl and LiCl—KCl have served well in numerous experimental electrochemical cells.

The inventors have found that, by including critical concentrations of the alkali metal sulfide that is the reaction product of the cell, e.g. lithium sulfide, within the cathode mixture, beneficial and unexpected results are produced. Sufficient lithium sulfide is included within the cathode material to provide a total molar, that is atomic, concentration of sulfur in stoichiometric excess of the total atomic concentration of iron or other transition metal. In the case of iron pyrite, $FeS_2$, the atomic concentration of sulfur is more than twice the atomic concentration of iron within the cathode material.

As shown above, elemental iron is one reaction product within the iron pyrite and lithium electrochemical cell. In some instances, iron is included as a current collector material within the cathode composition, but in accordance with a preferred embodiment of the invention, sufficient $Li_2S$ is also included to provide a stoichiometric excess of sulfur in respect to the iron.

The sulfide reaction product of the cell, $Li_2S$, is included within the cathode material for a number of reasons. It is found that even a small concentration of lithium sulfide, e.g. about 2 weight percent, is sufficient to enhance the wetting of carbon black with the electrolyte and thereby enhance the electrical conductivity between the iron pyrite and carbon black particles. Additional quantities of lithium sulfide within the initial cathode composition, for instance of about 25 weight percent, can be electrolyzed on charging the electrochemical cell to form additional cathode reactant. Where a stoichiometric excess of sulfur in respect to iron is provided, the additional cathode reactant appears to be in a form having a higher activity than that of iron disulfide. The additional cathode reactant, other than iron disulfide, could be elemental sulfur trapped within the composition or a sulfur compound. It is evidenced by high sulfur utilization and power density, as will be seen on considering the Examples below. This procedure of producing additional cathode reactant after the cell is assembled is of considerable advantage over prior techniques in which elemental sulfur is included within the initial cathode composition. On bringing the electrolytic cell up to operating temperatures, sulfur vapor easily escapes from these previous cells through interstices within the solid electrolyte prior to fusion.

In still another beneficial effect of the present invention, a formidable difficulty with the iron pyrite cathode material is overcome. The basic iron pyrite reaction with lithium metal incurs a theoretical volume increase of approximately 2.6 to 1. In the operation of experimental cells having iron pyrite electrodes, sufficient electrolyte or void space has been included in the cathode to accommodate an expansion of this magnitude, but distortion still occurred, indicating even larger than theoretical expansion. In cells having iron pyrite cathodes prepared in accordance with the invention, that is with excess Li$_2$S in the composition, the amount of expansion has been noticeably reduced. One possible explanation is that the additional cathode reactant produced by electrocharging the excess Li$_2$S reacts with a volume change more in accord with that incurred by the sulfur-lithium reaction of only approximately 1 to 1.2.

The following examples are presented to illustrate the novel cathode composition and method of the present invention. Table I given below summarizes the physical characteristics of the cells presented in Examples I–IV.

On assembling the cathode composition within the cathode chamber of an electrolytic cell, capacity densities greater than 0.3 amp-hr/cm$^2$ were measured at 0.1 amp/cm$^2$ to a 1.0 volt cutoff. This corresponds to a specific capacity of about 0.5 amp-hr/cm$^3$ of sulfur electrode volume. However, in spite of these promising results, a substantial volume increase was noted in the cathode materials.

EXAMPLE II (Cell S-52)

A somewhat larger electrochemical cell with a cathode composition substantially the same as that shown

TABLE I

| Example | I | II | III | IV |
|---|---|---|---|---|
| Cell No.[a] | S—48 | S—52 | S—50 | S—51 |
| Lithium Electrode | | | | |
| Area, cm$^2$ | 22.8 | 167.2 | 12.9 | 12.9 |
| Li or Li alloy, g | 10.2 | 19.9[b] | 2.5[b] | 2.5[b] |
| Electrolyte | LiCl-KCl | LiF-LiCl-KCl | LiF-LiCl-KCl | LiF-LiCl-KCl |
| Sulfur Electrode | | | | |
| Area, cm$^2$ | 16.5 | 50.8 | 5.1 | 5.1 |
| Active Material | FeS$_2$ | FeS$_2$ | FeS$_2$ + Li$_2$S | FeS$_2$ + Li$_2$S |
| Weight, g | 11.6 | 40.0 | 5.0 | 5.4 |
| Comp., wt % | | | | |
| FeS$_2$ | 60.0 | 60.0 | 33.5 | 23.7 |
| Li$_2$S | 2.2 | 2.2 | 26.6 | 34.5 |
| Electrolyte | 29.3 | 29.3 | 32.5 | 34.2 |
| Carbon Black | 7.0 | 7.0 | 6.6 | 6.9 |
| Fe | 1.5 | 1.5 | 0.8 | 0.7 |
| Equivalents, S | | | | |
| FeS$_2$ | 11.6 | 40.0 | 2.8 | 2.1 |
| Li$_2$S | 0.56 | 1.9 | 2.9 | 4.05 |
| Fe (as FeS$_2$) | 0.60 | 2.1 | 0.14 | 0.13 |
| Theoretical Capacity | | | | |
| Density, A-hr/cm$^2$ | 0.67 | 0.44 | 0.60 | 0.65 |

[a]The interelectrode distance for these cells was 0.6 cm, the temperature range was 380° to 400°C.; a boron nitride sheath was used for all of the cells.
[b]These anodes contained about 25 wt % copper and 75 wt % lithium impregnated within a porous metallic substrate.

EXAMPLE I (Cell S-48)

A little more than 11 grams of cathode constituents are blended together to form a flocculent mass of cathode material at the cell operating temperature of about 400°C. The cathode composition comprises about 60 w/o FeS$_2$, 2.2 w/o Li$_2$S, 29.3 w/o electrolyte (LiCl—KCl), 7 w/o carbon black and 1.5 w/o of particulate iron filings. The amount of iron is more or less stoichiometrically equivalent to the amount of sulfur within Li$_2$S, such that on charging this cell, all of the sulfur can be combined to form Fe$_2$S. The iron pyrite, lithium sulfide and iron filings are all commercial-grade products and, in some instances, contained inert impurities. For example, up to 15 w/o silicon oxide was noted in the iron pyrite samples. Particle sizes of about 0.015 μm to 0.2 mm have been found to be sufficient for use in the cathode composition. The carbon black is a finely divided commercial product of about 0.015 μm particle size. This carbon black material is of low porosity, that is, individual carbon black particles have low surface areas in respect to volume of the particles.

The cell constituents are thoroughly blended together within a vitreous carbon crucible at about 400°C. The resulting mixture appeared as a flocculent but homogeneous mass with intimate wetting of both the iron pyrite and carbon black particles with the electrolyte. The mixture is in contrast to previous cathode compositions containing no lithium sulfide in which separation of the iron pyrite and carbon black appeared.

in Example I was prepared. As in Example I, the cell size and characteristics are set forth in Table I. This cell, cell S-52, employed a cathode structure made of a molybdenum mesh basket enclosed with boron nitride cloth. A coiled molybdenum mesh current collector was placed within the basket and in electrical contact with the cathode composition. The electrode assembly was covered with boron nitride cloth and compressed between two molybdenum nuts. The cathode as thus prepared was assembled within a sealed electrochemical cell containing an anode as described above, except that approximately 25 w/o copper was blended into solution with the lithium metal. The initial operation of the cell was interrupted by a short circuit between the electrodes caused by expansion of the cathode composition. After the electrical short was cleared up, the cell was operated for 165 hours and 21 cycles.

Figure 2:
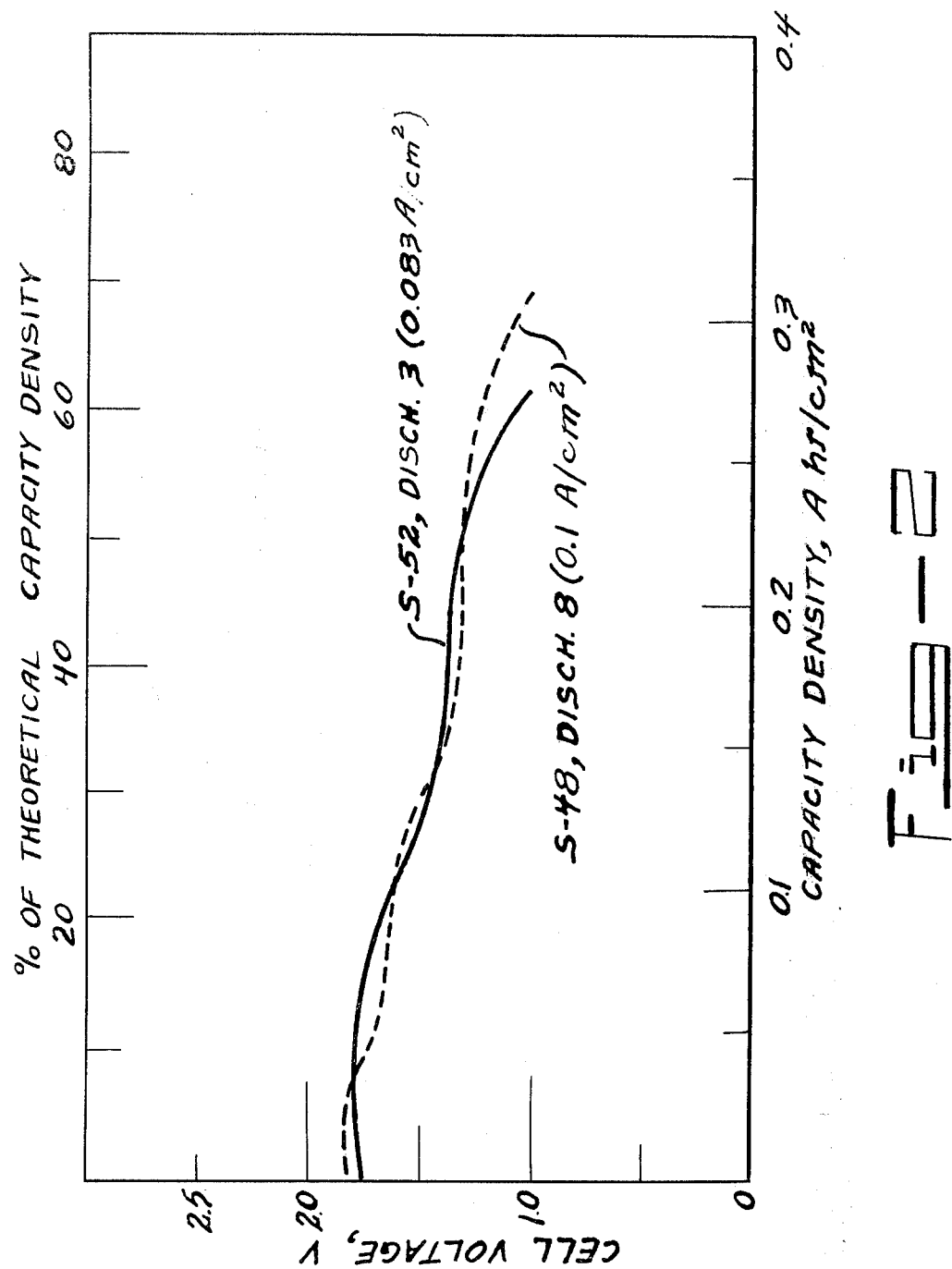
FIG. 2 is a graph showing voltage v capacity density for cells S-48 and S-52.

The performance of cells S-48 and S-52 as described in Examples I and II above is further illustrated in FIG. 2 which shows a plot of cell voltage versus capacity density over the discharge portion of the cell cycle for each of the cells.

EXAMPLE III (Cell S-50)

Cell S-50 was prepared in much the same manner as cell S-48 and its characteristics are also shown in Table I. This cell includes a substantial concentration of lithium sulfide within the initial cathode composition, thus providing a considerable stoichiometric excess of sulfur over that required to form iron disulfide.

Figure 4:
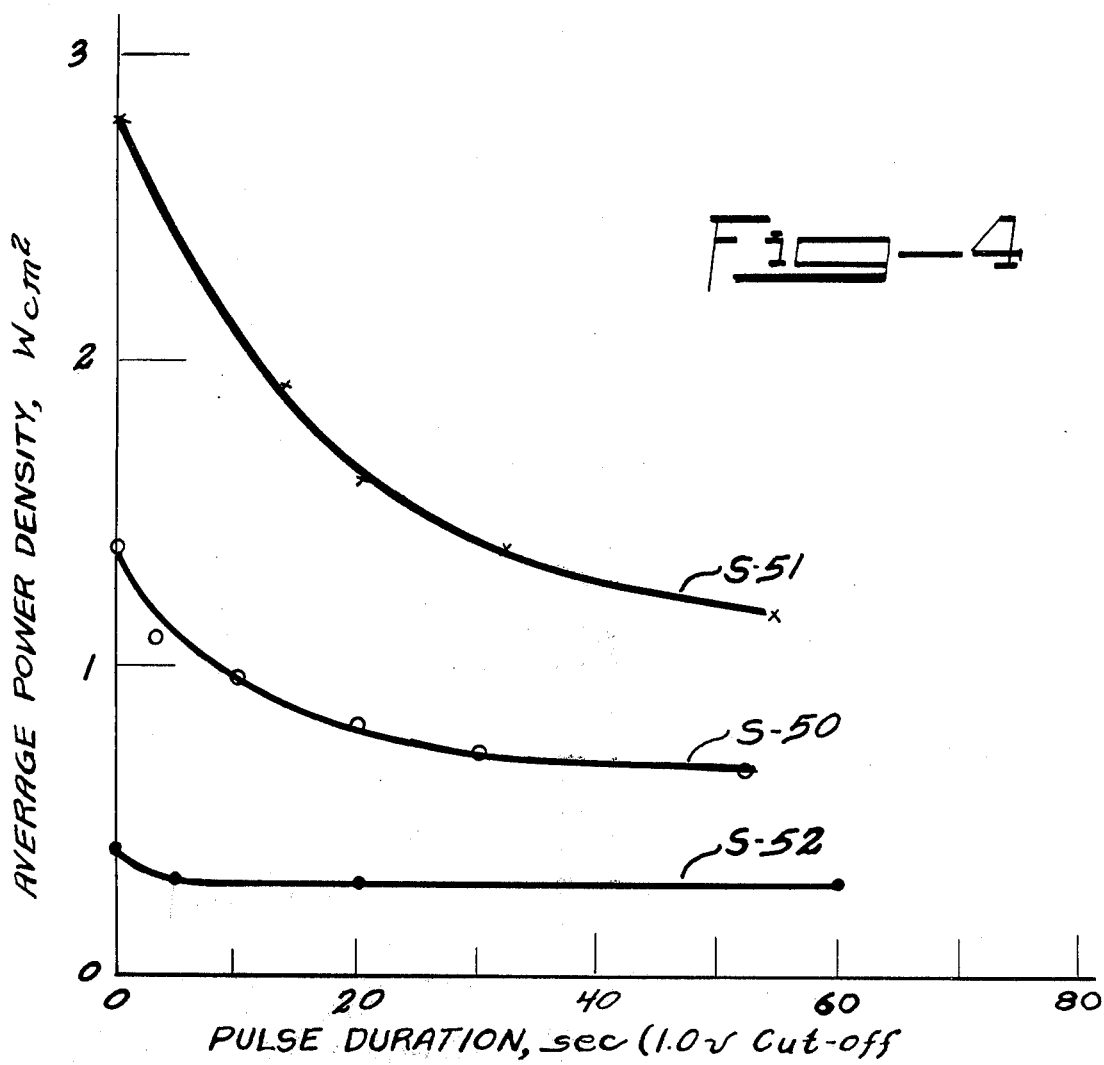
FIG. 4 is a graph of average power density v pulse duration for cells S-50, S-51 and S-52.
Figure 3:
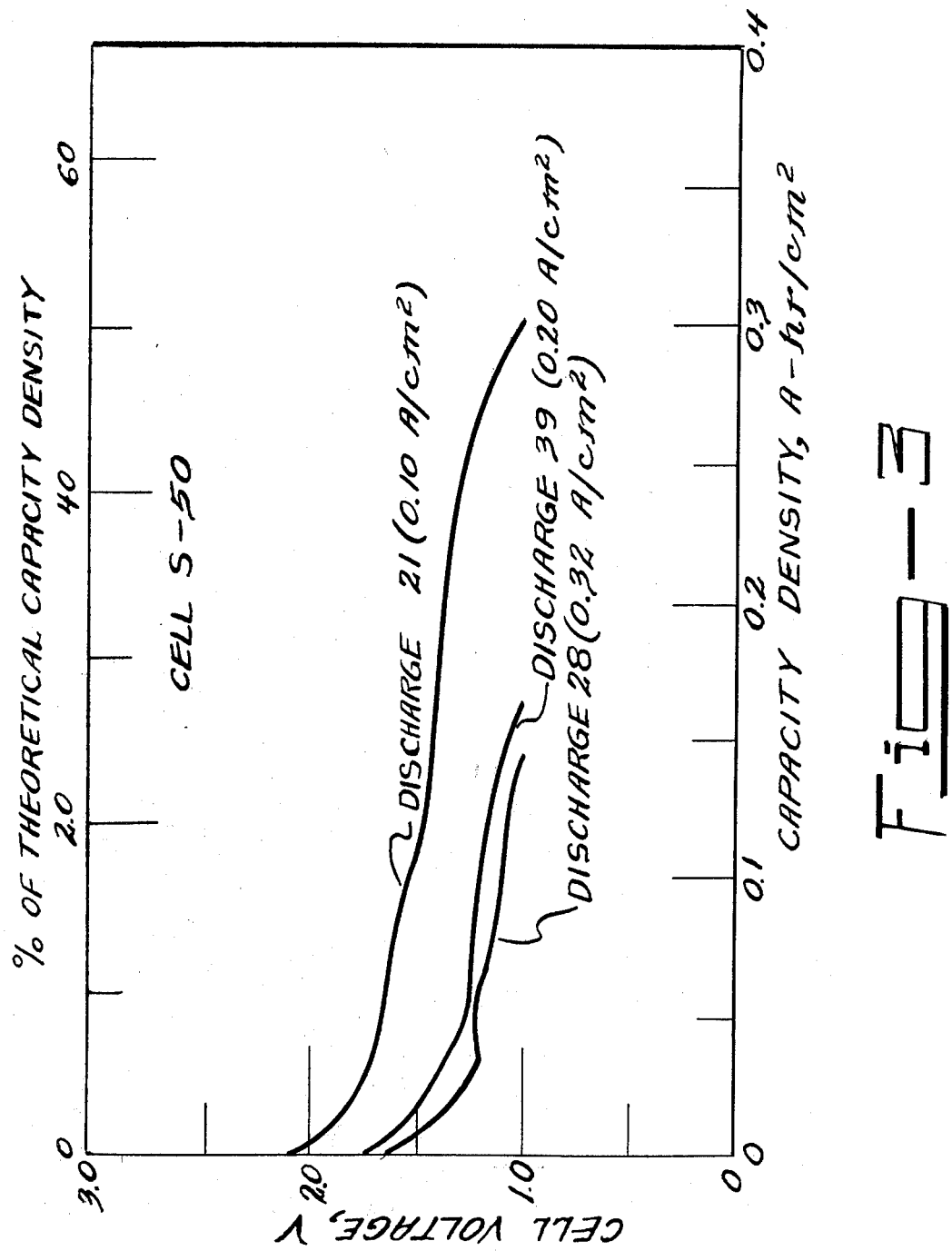
FIG. 3 is a graph of voltage v capacity density for cell S-50.

This cell operated for over 900 hours and 90 cycles. The cell voltage as a function of capacity density at three discharge cycles and current densities are shown in FIG. 3. Initial voltages as thus shown are somewhat higher than those shown in FIG. 2 for cells 48 and 52, but more important this cell demonstrated a much higher power density than the previous cells having only small quantities of $Li_2S$ in the initial cathode composition. Power densities even for a short time are of importance in evaluating a cell or battery for use as a power supply within an electric automobile or other vehicle. Shortime power densities as much as 1.4 watts per $cm^2$ with power densities of 0.6 watt per $cm^2$ sustained for up to 50 seconds were obtained from cell 50. This is in contrast to short-time power densities of only 0.5 watt per $cm^2$ obtained in cell S-52 and cell S-48. A comparison of power densities is illustrated in FIG. 4. Additional detailed performance data for cell S-50 are given below in Table II.

manner as cell S-50 except that a larger concentration of lithium sulfide is included in the cathode composition. A short-time power density of 2.8 watts per $cm^2$ was obtained which is greater than that of the previous cells. Also a power density greater than 1 watt per $cm^2$ was sustained for up to 55 seconds. The power density of cell S-51 is shown in FIG. 4 as well as those of cells S-50 and S-52.

Figure 5:
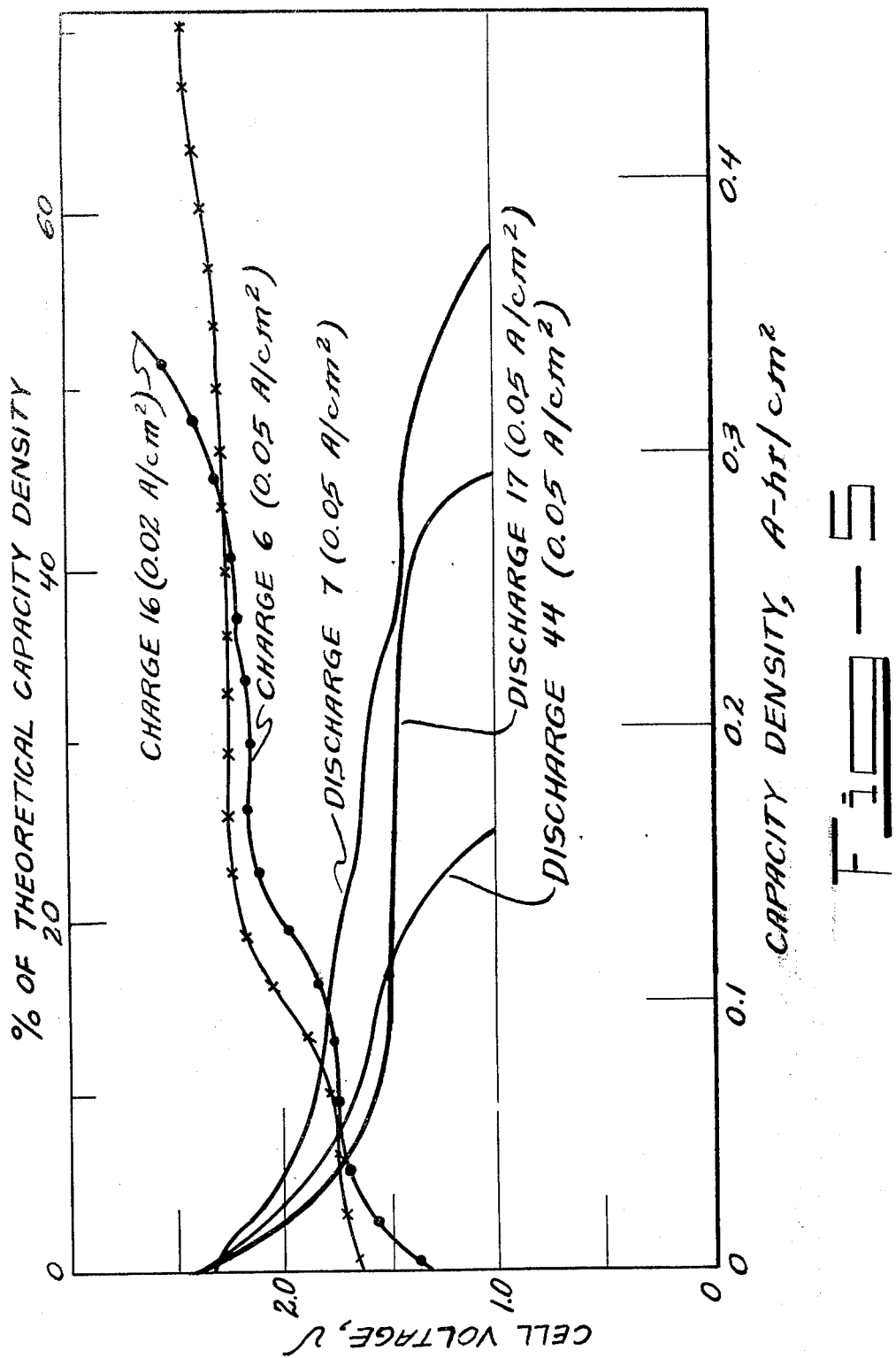
FIG. 5 is a graph showing voltage v capacity density for cell S-51.

The operation of cell S-51 continued for 770 hours and 53 cycles, but after about 500 hours of operation the capacity density dropped to about one-half its original value at 1 volt cutoff. In FIG. 5 this rapid drop in capacity density is illustrated for discharge cycles 7, 17 and 44. Since the total equivalents of sulfur within the cathode of cell S-51 is almost three times that required to combine with the iron as iron disulfide (see Table I), substantial amounts of free elemental sulfur were possibly produced during electrocharging. Loss of this reactant into the electrolyte could account for the decrease in capacity. For this reason, it is of importance to limit the amount of sulfur introduced as product of the cell reaction ($Li_2S$) to about twice that required to combine

TABLE II

PERFORMANCE DATA FOR CELL S-50*

| Cycle No. | Discharge Current Density, $A/cm^2$ | Charge Current Density, $A/cm^2$ | Discharge Capacity Density, $A/cm^2$ | Percent of Theor. Cap. Density, % | Average Discharge Voltage V | Watt-Hr Efficiency % |
|---|---|---|---|---|---|---|
| 3  | 0.11 | 0.05 | 0.25 | 41.7 | 1.5 | 57.8 |
| 21 | 0.11 | 0.05 | 0.32 | 53.3 | 1.4 | 65.5 |
| 28 | 0.31 | 0.05 | 0.14 | 22.6 | 1.2 | 15.3 |
| 31 | 0.06 | 0.10 | 0.21 | 35.2 | 1.5 | 73.3 |
| 34 | 0.11 | 0.20 | 0.18 | 29.2 | 1.3 | 64.7 |
| 39 | 0.20 | 0.20 | 0.16 | 26.9 | 1.1 | 44.3 |
| 71 | 0.10 | 0.05 | 0.36 | 60.3 | 1.5 | 60.0 |

*The charge and discharge cutoff voltages were 2.37 V and 1.0 V, respectively.

It can be seen from Table II that at least some of the sulfur introduced into the cathode composition as $LiS_2$ is converted into a cathode reactant. The theoretical capacity density employed in computing the fifth column of Table II is based on reaction of all of the sulfur in both the $FeS_2$ and in the $Li_2S$. In Example III the amount of sulfur required to combine with all of the iron as $FeS_2$ is about one-half the total sulfur in the cathode composition. (See Table I for equivalents of sulfur.) Phrased differently, the atomic concentration of sulfur in this cathode is about four times the atomic concentration of iron. Thus, a reaction of all the $FeS_2$ to form $Li_2S$ in any one cycle, which is most improbable, would provide a percentage of theoretical capacity density of only 50%. In view of the above percentages near and in excess of 50%, it is only reasonable to conclude that a cathode reactant other than $FeS_2$ is present within the charged cell of this example.

Another aspect of cell 50 performance shown in Table II is the reproducible capacity density with cycling. Cycles 3, 21 and 71, all having approximately the same charge and discharge currents, show a slight increase in capacity with cycling. Intervening cycles shown in the table were either charged or discharged at increased currents which accounts for their decreased capacity densities.

EXAMPLE IV (Cell S-51)

Characteristics of this cell are also given above in Table I. The cell is constructed essentially in the same with iron in $FeS_2$. Such a concentration was included in cell —50 of Example III and, as was discussed above respecting Table II, the cell capacity had actually increased slightly between the third and seventyfirst cycles.

It is also observed in both cells S-50 and S-51 that relatively small volume increases were incurred after the initial discharge with resulting higher specific capacities (amp hours per $cm^2$) than for cells S-48 and S-52. The smaller volume increases are attributed to the higher lithium sulfide concentration within the initial cathode composition.

Although the invention has been described with respect to a few reactant materials, it will be clear that various other reactants within both the anode and the cathode can be employed. For example, various other alkali metals such as sodium or an alloy of lithium can be used within the anode. Potential cathode materials other than iron disulfide include those listed hereinabove. In accordance with the invention, the reaction product of those various transition metal sulfides with lithium cation or other alkali metal cation as produced in the cell reaction is blended into the initial cathode composition at a sufficient atomic concentration to provide a stoichiometric excess of sulfur in respect to that transition metal within the cathode.

It can be seen that the present invention provides a novel cathode composition including a metallic sulfide as a cathode reactant intermixed with a reaction product of that sulfide and the alkali metal employed as the cell's anode reactant. Through use of this composition, cathode reactant including sulfur can be entrapped within the cathode material without incurring sulfur losses that would otherwise result from sulfur vaporization prior to fusion of the electrolyte. It is also found that this reaction product, e.g. lithium sulfide, enhances the wetting of carbon-current-collector material within the cathode composition and thereby decreases the cell resistance.

The embodiments of the invention in which an exclusive property or privilege is claimed are defined as follows:

1. In a secondary electrochemical cell including an alkali metal reactant in the anode, a cathode composition including a chalcogen reactant in the cathode and an electrolyte containing ions of said alkali metal, the improvement wherein said cathode composition comprises: at least one transition metal sulfide and a sulfide reaction product of said alkali metal and said transition metal sulfide, the total atomic concentration of sulfur combined with said transition metal and said alkali metal reactant within said cathode being in stoichiometric excess of the total atomic concentration of said transition metal.

2. The improved cathode composition of claim 1 comprising $FeS_2$ and at least 2 w/o $Li_2S$.

3. The improved cathode composition of claim 2 wherein the total atomic concentration of sulfur is in excess of twice the total atomic concentration of iron in said cathode.

4. The improved cathode composition of claim 3 wherein the atomic concentration of sulfur is about four times the atomic concentration of iron and the atom equivalents of sulfur in said cathode are about twice that required to combine with iron as iron disulfide.

5. The electrochemical cell of claim 4 wherein said cathode comprises by weight about 33% $FeS_2$, 27% $Li_2S$, 33% electrolyte and 7% carbon black.

6. A method of preparing a cathode for use in a secondary electrochemical cell wherein said cell includes a cathode structure with inner chamber, an anode with an alkali metal reactant, and an electrolyte including ions of said alkali metal in contact with both of said electrodes, the improvement comprising:
   a. blending particulate transition metal sulfide, sulfide reaction product of said anode reactant and said transition metal sulfide, molten electrolyte and particles of electrically conductive material to form a cathode composition; and
   b. assembling said cathode composition into said cathode structure of said electrochemical cell for use as a source of electrical power.

7. The method of claim 6 wherein said electrochemical cell is heated to an operating temperature at which said cathode composition is submerged in molten electrolyte; and electrically charged to convert said sulfide reaction product into cathode reactant other than transition metal sulfide at said operating temperature.

8. The method according to claim 7 wherein said sulfide reaction product is $Li_2S$, said transition metal sulfide is $FeS_2$ and said electrolyte comprises a eutectic composition of LiF—LiCl—KCl having a melting point of about 350°C., said $Li_2S$ is included within said cathode composition in an amount to provide a stoichiometric excess of sulfide within said cathode to that needed to combine as $FeS_2$.

9. The method according to claim 7 wherein said cathode composition is formed by blending powders of lithium sulfide and iron disulfide with molten LiF—LiCl—KCl electrolyte in a weight proportion of about 27%, 33% and 33%, respectively, along with about 7 w/o carbon black.

10. The method of claim 7 wherein said cathode composition is assembled in said cell within a cathode enclosure having a window of porous fabric facing said anode and exposed to said electrolyte.

* * * * *